Oct. 28, 1969      C. B. COLEMAN      3,474,965
LIQUID PROPORTIONING AND METERING PUMP SYSTEM
Filed Aug. 28, 1967
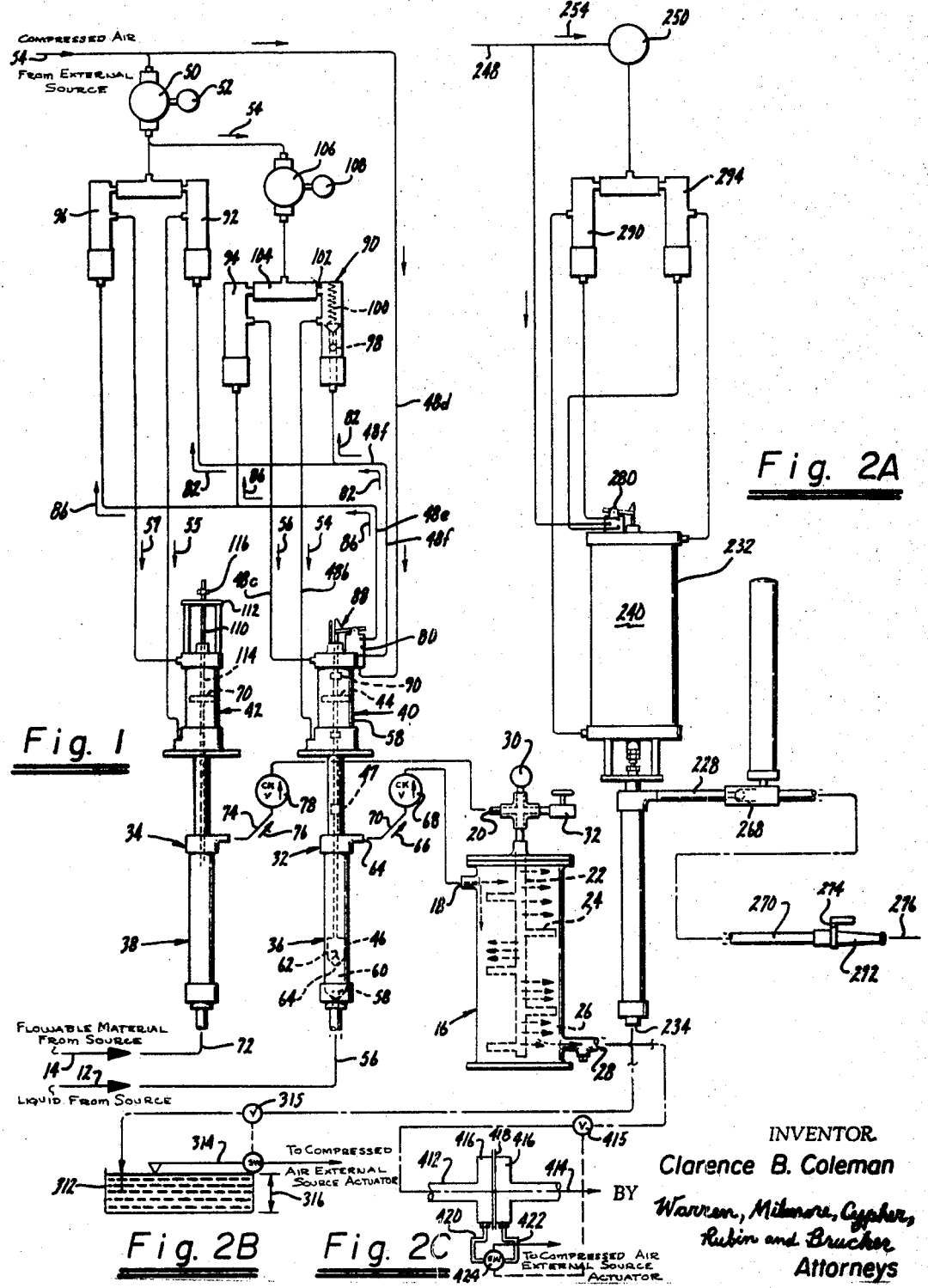
INVENTOR.
Clarence B. Coleman
BY Warren, Milmore, Cypher, Rubin and Brucker
Attorneys United States Patent Office 3,474,965
Patented Oct. 28, 1969

3,474,965
LIQUID PROPORTIONING AND METERING PUMP SYSTEM
Clarence B. Coleman, Oakland, Calif.
(2401 Merced St., San Leandro, Calif. 94577)
Filed Aug. 28, 1967, Ser. No. 663,711
Int. Cl. A01g 27/00; A62c 13/60
U.S. Cl. 239—68                    7 Claims

ABSTRACT OF THE DISCLOSURE

Apparatus for pumping each of at least two flowable materials into a common reservoir for mixing therein and thereafter being discharged in mixed condition. The reservoir internal pressure, which is a function of the amount of mixture discharged or withdrawn, is maintained relatively constant by pumping additional flowable materials into the reservoir in response to withdrawal of mixture therefrom. More specifically, this is accomplished by means of positive displacement pumps, including air pistons drivably connected to the fluid pumping and priming pistons thereof, with the air pistons of the pumps interlocked pneumatically, so that all are driven through a stroke cycle only after one such air piston, commonly referred to as the master, has been travelled to a preselected position. A restrictor is provided in the line conveying compressed air to the master air driven piston so that the latter travels slower and causes reversal of stroking of all air driven pistons only after that of the master has completed its corresponding stroke. Thus, the ratio of quantities of the various flowable material being pumped into the reservoir are maintained at an almost constant relationship and at a predetermined reservoir pressure free of any attendance by an operator.

---

In a number of industrial applications, it is desirable and indeed in some cases essential to provide a combination of pumping and metering of various liquids wherein the mixture ratio of the several liquids is maintained at a substantially constant relationship, and the mixture itself is continually replenished in accordance with the demand made for supplying such mixture. One example of this occurs in the washdown of jet aircraft on the field subsequent to flight and prior to continued use. A critical mixture of a caustic liquid, such as a strong base, diluted with water is employed to provide the appropriate wash solution—one that is dilute enough not to harm the skin of the aircraft yet sufficiently strong to effectively remove dirt, scum, and other surface contaminants which might otherwise interfere with flight efficiency. Present techniques for accomplishing such washdown procedure with which I am familiar include relatively elaborate pumping and mixing devices which depend upon an operator's constant attention to avoid a too weak or too strong wash solution. This is complicated by the usual arrangement of such equipment which provides a plurality of nozzle outlets at the end of a length of flexible hose generally remote from the apparatus wherein the mixing and pumping of the water and cleaning reagent are accomplished.

Other examples of the general techniques related in the foregoing paragraph could be made; for example, various liquid blending performed in certain petroleum processes require critical mixtures of two or more liquids with the resultant mixture utilized in varying amounts through a given cycle of the process. In such a case, the demand may be sensed by a pressure drop past an orifice located in the conduit carrying the mixture to its zone of usage. A further example could involve such a mixture discharged into a storage tank for withdrawal therefrom from time to time as need arises.

In all of the foregoing examples, certain common problems arise—the need to maintain a relatively constant mixture ratio; the desirability for maintaining the mixture at a certain predetermined pressure; the need to maintain a relatively fixed amount of mixture, irrespective of the demand by usage, either in a constant flow or in a liquid storage tank; and the desirability of accomplishing the foregoing without reliance upon the presence or judgment of a human operator.

Thus, it is an object of this invention to provide a liquid proportioning and metering system wherein two or more liquids, sometimes referred to as the liquid and flowable material, are pumped from their respective sources at a preselected ratio of one to the other for mixing together, wherein the rate of such pumping is responsive to the demand made by final use of the liquid mixture.

Another object of this invention is to provide the aforementioned liquid mixture at a predetermined pressure consistent with the needs for the mixture at point of usage.

A feature and an advantage of this invention is that the foregoing objects may be accomplished without the need of operator surveillance even during period of usage of the liquid mixture wherein such usage varies and hence makes a varying demand for the liquid ingredients from their source.

Another feature and advantage of this invention is that the apparatus itself is relatively simple, requires relatively few individual components making initial installation economic; long-range maintenance relatively minor; and, because of the avoidance of additional operator surveillance at the apparatus itself, one of relatively inexpensive carefree operation.

Other objects, features and advantages of my invention should become apparent to one of ordinary skill in the art upon a reading of the specification that follows and by referring to the accompanying drawing in which:

FIGURE 1 is a side elevation of one embodiment of my invention shown generally in schematic form;

FIGURE 2 is a side elevation in schematic form of one embodiment of a portion of my invention which may be utilized in conjunction with the apparatus shown in FIGURE 1;

FIGURE 2B is a sectional elevation in schematic form of an alternative portion of my invention which may be utilized in conjunction with the apparatus shown in FIGURE 1; and FIGURE 2C is a partial side elevation partly in schematic form of another alternative of my invention which may be used in conjunction with the apparatus of FIGURE 1.

The apparatus shown in FIGURE 1 receives two liquids, one referred to as a liquid and the other as a flowable material for purposes of distinguishing one from the other, from sources (not shown) as indicated by arrows 12 and 14, respectively. The liquid, for example water, and flowable material, which may be a substance such as a strong caustic or the like for dilution with the water to produce a mixture having a preselected ratio of water and caustic, are pumped into reservoir 16, the water being conveyed through input port 18 while the caustic material to be diluted therewith is admitted through input port 20 and thence downwardly through hollow agitator stem 22 from whence the caustic reagent or flowable material is dispensed through apertures located in the agitator stem and distributed as indicated by dispersion arrows 26. Dispersion arms 24 appropriately secured to the agitator stem are provided to further enhance mixing of the liquids within reservoir 16. The hollow agitator stem and dispersion arms are driven by suitable conventional attachments to achieve a rotary and/or reciprocal movement within reservoir 16 to thoroughly mix the liquid and flowable material so that the mixture discharged through discharge port 28 is substantially homogeneous.

Reservoir 16 is of the totally enclosed type as shown in the drawing and is provided with pressure gauge 30 and normally closed bleeder valve 32. The output from reservoir 16 may be drawn through discharge port 28 for subsequent usage, explained hereinafter in respect to FIGURES 2A, 2B, and 2C.

Liquid and flowable material are pumped into reservoir 16 by means of pumps 32 and 34, respectively; and, in the embodiment shown, these pumps are of the positive displacement piston type, for example those of the double acting pump stem type as manufactured by the Grover Manufacturing Company of Montebello, Calif., and further identified by that manufacturer as their series 433. Such pumps include, respectively, liquid pump cylinders 36 and 38 provided with double acting air piston and cylinder assemblies 40 and 42. The pumps generally are of similar construction with the exception of certain modifications which shall become apparent in the ensuing description. Immediately hereafter reference is made only to pump 32, although it is understood that the same general principles and description apply to pump 34; and a detailed description of the latter, to the extent that it is similar to that of pump 32, is omitted for purposes of brevity and clarity of specification.

Double acting air piston and cylinder assembly 40 includes air piston 44 driveably connected to pump piston 46. Compressed air from an external source (not shown) enters the system through conduit leg 48a and thence through pressure regulator 50, having pressure gauge 52, in the direction of arrows 54 through conduit leg 48b; or, alternatively, in the direction of arrow 56 through conduit 48c. Such compressed air enters cylinder 58 to cause double acting piston 40 to stroke reciprocally therein; the latter and other functional aspects of my invention associated with apparatus illustrated directly above pumps 32 and 34 in FIGURE 1 are explained in greater detail hereinafter in respect to the synchronizing features of my invention.

As double acting air piston 44 is first travelled upwardly, pump primer piston 46 also moves upwardly to draw liquid through conduit 56 past check ball 58 and into piston chamber 60. Primer piston 46 is itself of a check valve construction utilizing check ball 62 directly over piston aperture 64 so that liquid drawn into cylinder chamber 60 on the upstroke of air piston 44 remains primed within cylinder chamber 60 when the stroke is reversed; and on subsequent strokes additional liquid is taken in until the level is such that actuator piston 47 is displaced into the primed liquid residing in the cylinder chamber. At such time, which is during normal operation of the pump on alternate stroking, liquid is displaced therefrom through outlet port 64 in the direction of arrow 66 through ball check valve 68 and thence through input port 18 to reservoir 16.

As indicated earlier, flowable material pump 34 is generally similar to liquid pump 32 including air piston 46 driveably conected to a pump primer and actuator piston, associated ball checks and the like which coact to draw flowable material through conduit 72 for eventual discharge through conduit 74 in the direction of arrow 76 past check valve 78 and thence to input port 20, as explained hereinabove.

A feature of my invention is that pumps 32 and 34 respond automatically to any demand which may be made upon withdrawal and usage of mixture from reservoir 16 so as to make up for the mixture so withdrawn while maintaining a predetermined pressure level within the reservoir. At the same time, the rate of replenishment is substantially proportional to the rate of withdrawal, the limit being the rate at which pumps 32 and 34 may operate under a given pressure of applied compressed air. The accomplishment of these features may be understood by an analysis of the structure of my invention described thus far. More particularly, the discharge pressure of liquid or flowable material from pumps 32 and 34, respectively, is directly proportional to the pressure exerted by the working fluid or compressed air applied to air pistons 44 and 70; and at equilibrium, when no mixture is being withdrawn from enclosed reservoir 16, the pressure within reservoir 16 also reaches an equilibrium pressure. The equilibrium pressure in reservoir 16 provides the back pressure through conduits 70 and 74 which is applied to the pump actuator pistons; and this in turn resists the regulated compressed air force applied to the air driven piston connected thereto. At equilibrium, the pressure within reservoir 16 is a predetermined pressure whose value is a function of the relationship between the areas of the actuator pistons and the air pistons of the pump assemblies. By regulating the compressed air pressure from the external source through regulator 50, the predetermined pressure within reservoir 16 may be set at any desirable value within the operating range of the equipment; and, if no mixture is withdrawn from reservoir 16, the pumps themselves will remain substantially at rest. As mixture is withdrawn from reservoir 16, the pressure therein drops from the aforementioned predetermined value; the back pressure through conduits 70 and 74 decreases; and compressed air actuation of the double acting air piston and cylinder assemblies 40, 42 of pumps 32 and 34, respectively, will again commence. The pressure level of the compressed air source is regulated to provide a relatively constant preselected value; thus, if the mixture is rapidly withdrawn from reservoir 16 thereby dropping the internal pressure at a relatively high rate, then the air actuation of each of pumps 32 and 34 will accelerate accordingly. This will tend to replenish the amount of material discharged into reservoir 16 at an increasing rate until the predetermined pressure level within reservoir 16 is re-established in equilibrium with the regulated pressure of compressed air applied to the double acting piston and cylinder assemblies.

From the foregoing, it can be seen that each of the air pistons driveably connected to their respective pump actuator pistons cause the latter to draw in and discharge fluid material from each pump assembly at the same stroke rate as that of the air piston, the latter being adapted to stroke by the application thereto of a regulated pressure of compressed air available from an external source, and at a stroke rate which is proportional to the difference in the pressure of the applied compressed air and the internal pressure of the reservoir. The pressure of the compressed air or working fluid may be selected so that the equilibrium pressure within the reservoir, and of the mixture of materials discharged therein, is maintained at a predetermined pressure.

Another feature of my invention is that the foregoing described pump assembly synchronizes the discharge output from each pump so as to maintain a relatively constant pre-selected mixture ratio of liquid and flowable material being delivered into the reservoir 16. In the embodiment of my invention shown on the accompanying drawing, this is achieved by conventional air selector 80 which diverts compressed air from conduit leg 48c into one of two discharge conduits, 48e or 48f, in the direction of arrows 82 and 86, respectively. The choice of which conduit leg 48e and 48f is charged with compressed air is a function of the position of air piston 44; that is, when air piston 44 is in its furthest upward direction of travel, arm assembly 88 is actuated by air piston 44 bearing against stop 90. In a manner already known to those familiar with such pumps, the latter action causes selector 80 to internally divert the flow of compressed air which had previously been conducted through conduit 48f, and hence to control valves 90, 92; to conduit 48e, which actuates control valves 94, 96. This action in turn discontinues air from being delivered through conduit 48b and 49b in the direction of arrows 54 and 55; and instead causes air to flow through conduit lines 48c and 49c in the direction of arrows 56 and 57, thereby reversing the direction of travel of air pistons 44 and 70. The foregoing double acting air piston and cylinder assemblies, as can be seen from the drawing, are connected in parallel circuit arrangement, so that both double acting air piston and cylinder assemblies are reversed by the action of a single air cylinder and its associated air selector 80. For this reason, pump assembly 32 is sometimes referred to as the "master" and pump 34 the "slave."

Control valve 90, which is substantially similar to valves 92, 94, and 96, is shown with portions of its internal structure shown by phantom lines and in schematic representation. Air conveyed by conduit 48f in the direction of arrow 82 enters valve 90 urging ball 98 upwardly against compression spring 100, thereby opening an aperture so that compressed and pressure regulated air passing through inlet 102 communicates therethrough to conduit 48b to actuate air piston 44 as explained earlier. At the same time, air is conveyed through an extension of conduit 48f to control valve 92, so as to actuate piston 70.

A device 106 similar to reducer 50 is inserted in the line between pressure regulator 50 and T-connection 104 which provides air to drive air piston 44. Such device is more particularly referred to as air restrictor 106, including pressure indicating gauge 108, which limits the rate at which air is admitted to air piston 44. The restriction is selected so that the rate of air admission to cylinder 58 is a value less than the rate at which air passes through control valves 92 and 96 to drive air piston 70. In this manner, the travel of air piston 44 to one extreme of travel of its stroke may be made to occur only after air piston 70 has completed its travel through the same portion of the stroke cycle. Thus, since the position of air piston 44 alone determines whether selector 80 shall charge both double acting air piston and cylinder assemblies so as to reverse the direction of stroke of the air pistons therein, air driven piston 44 may always be made to stroke only after air piston 70 has completed its corresponding stroke cycle, and before each air piston is reversed. In this manner, I achieve synchronization of both pump assemblies 32 and 34, i.e. a relatively substantial degree of certainty that the amount of flowable material being discharged into reservoir 16 is maintained in a generally constant relationship to liquid being discharged therein. Moreover, this feature of my invention is accomplished with the same components which provide replenishment of the mixture in reservoir 16 in response to demand of such mixture removed therefrom for varying usage.

Another feature of my invention is that the mixture of liquid to flowable material may be varied. I achieve this by means of adjusting bolt 110 threadedly supported by bracket 112. One end of the bolt is sealably inserted through the head of cylinder assembly 42 and thence downwardly with the tip 114 located at a preselected position so as to stop air piston 70 in its upward travel. Nut 116 is provided to lock the adjusting bolt in place once the desired position of tip 114 is determined. Air piston 70 is now restrained to a given stroke length which in turn controls the amount of flowable material discharged from the assembly upon each stroke of the pump. In this manner, a broad range of liquid and flowable material mixture ratios may be pre-selected in accordance with the needs of the particular usage involved.

It should be noted that although I have shown and described a particular type of air driven double-acting piston pump and pneumatic cross-tie to achieve certain aspects of my invention, other cross-tie arrangements embracing my invention may be used. For example, reversal of the double-acting piston and cylinder assembly may be achieved by having selector 80 actuate electrical solenoid driven valves arranged to change the direction of air flow into the air piston and cylinder assembly thus reversing the direction of stroke of the air pistons. Also, the double acting air piston itself need not be pneumatically driven in both directions, but may be of the type which is air driven in one direction of stroke travel and spring returned in the other. Thus, a reciprocally driven air piston and cylinder assembly is a matter of choice and not a limitation of my invention.

Although I have shown two pumps providing liquid and flowable material to the reservoir, it should be apparent that any number of slave pumps could be controlled by a single master utilizing the same techniques as set forth above in respect to two pumps coacting to maintain a constant ratio mixture of pre-selected value and at a predetermined pressure.

Referring now to FIGURE 2A in the accompanying drawing, I show one embodiment of that portion of my invention relating mainly to ultimate discharge and usage of the mixture prepared in reservoir 16. More specifically, a third pump 232, similar in most respects to liquid pump 32 explained in greater detail hereinabove, is provided with intake port 234 in fluid communication with discharge port 28 of reservoir 16. Compressed air from external source (not shown) is conveyed through conduit 248 in the direction of arrows 254 and 255, that portion indicated by arrow 255 being used to charge selector 280 which functions in a manner similar to that described in respect to pump 32. Here, however, selector 280 controls valves 290, 294, the latter being alternatively actuated to provide pressure regulated air from regulator 250 into the double acting air piston and cylinder assembly 240. Material is drawn from the reservoir through the intake port and then discharged under high pressure through discharge line 228, past check valve 268 and thence through flexible conduit 270 to discharge nozzle 272. The nozzle is provided with level operated valve 274 so that a mixture of liquid and flowable material may be discharged therethrough in the direction indicated by arrow 276. When valve 274 is closed, the back pressure against pump unit 232 attenuates further action of the air driven piston therein; and this in turn causes the pressure in reservoir 16 to be increased to its predetermined level, hence stopping the action of pump units 32 and 34 as hereinabove explained.

The foregoing described embodiment may be preferable in the application for washdown of jet aircraft and the like described earlier in this specification; and additional hose units including flexible conduit 270, discharge nozzle 272, and valve 274 may be provided from a common header. In this way, any number of operators may be actively engaged in the necessary washdown operation with little or no operator attention necessary to assure proper critical ratio of caustic material to water diluent. Moreover, as described and explained earlier in this specification, only the amount of mixture necessary to satisfy the demands of the various operated discharge nozzles is pumped from pumps 32 and 34 to reservoir 16.

Another embodiment of a portion of my invention in respect to use of the mixture being discharged from reservoir 16 is shown at FIGURE 2B. In this embodiment, the discharge from reservoir 16 is taken directly to storage tank 312 shown in schematic cross section. Float switch 314 is provided to responsively sense a preselected liquid level as shown by dimension 316. Solenoid controlled valve 315 may then be actuated to cause mixture to flow from the reservoir to storage tank 312; and pumps 32, 34 are caused to co-function as described earlier in response to pressure drop in the reservoir. When liquid level 316 is restored, pressure builds up in reservoir 16, and the system comes to rest. Alternatively, when mixture material is withdrawn from storage tank 312, thereby decreasing liquid level height 316, switch 314 may be arranged to actuate flowable material and liquid pumps 32 and 34 by causing compressed air to be conveyed into the system. A detailed description of the electro-pneumatic circuitry to accomplish this is believed unnecessary in this specification, since such circuitry is not per se claimed by me as my invention and is believed apparent to those skilled in the art. Upon replenishment of mixture material until preselected liquid level 316 is restored, the switch then deactuates the aforementioned pump units; and no additional material is pumped to the storage tank until subsequent withdrawals therefrom require such replenishment.

Still another embodiment of my invention in respect to the handling of the discharge from reservoir 16 is shown in FIGURE 2C. There I show a portion of line 412 associated with a process which requires varying amounts of a mixture having a predetermined mixture ratio of liquid and flowable material delivered therethrough in the direction of arrow 414, line 412 being in fluid communication with discharge port 28. Conduit line 412 may be directed to a point of usage in the process downstream from reservoir 16 so that back pressure therefrom to the reservoir may indicate directly consumption at that point; and hence the remainder of the system—pumps 32, 34, etc., may coact as described hereinabove to replenish mixture as consumed. Alternatively, as shown in the drawing conduit line 412 may have interposed therein conventional flanges 416 suitably joined together with orifice plate 418 interposed therebetween; and proximate fluid communicating lines 420, 422 operably connected to differential pressure switch 424. Thus when a pressure drop across orifice plate 418 indicates consumption of the mixture downstream therefrom, then and only then pressure differential switch 424 may cause a valve such as 415 to be opened to permit mixture to be withdrawn from the tank, so that the system functions as described above in respect to FIGURE 2B. Alternatively, in a manner apparent to those skilled in the art, switch 424 may cause compressed air from the external source therefor to be delivered into the system immediately upstream from regulator 50 and pumping commences as described hereinabove in respect to FIGURE 1. As downstream usage of material mixture becomes diminished or ceases altogether, the pressure difference on either side of the orifice plate, as transmitted through lines 420, 422, causes differential pressure switch 424 to deactuate the flow of compressed air from the external source therefor; and the entire system may be deactuated. At the same time, should the pressure drop in reservoir 16 become too pronounced with respect to the relatively static condition upstream from orifice 418, due to leakage and the like then the pressure differential switch again would actuate flow of compressed air to pumps 32 and 34 to bring the system back into equilibrium and readiness for continued use by the process downstream therefrom.

Although I have explained my invention in some detail in respect to the various embodiments shown on the accompanying drawing, it is understood that this is done for sake of clarity and for purposes of illustration and is not intended to unduly limit my invention which may be practiced in a variety of ways within the spirit thereof.

I claim:
1. Apparatus for receiving a liquid and a flowable material from separate sources therefor and for delivering a mixture having a preselected ratio of said liquid and flowable material at a relatively constant pressure, comprising:
   a reservoir having input means for receiving said liquid and flowable material, and discharge means to deliver varying amounts of said mixture from the reservoir;
   pump means adapted to pump, respectively, said carrier liquid and flowable material at predetermined flow rates through said input means into said reservoir so that the amounts thereof are in said preselected ratio, said pump means being responsive to the fluid pressure within said reservoir and adapted to pump said liquid and flowable material into the reservoir to a preselected pressure at a rate proportional to the difference between said pressures, whereby the amount of said liquid and flowable material mixture delivered to the reservoir is varied in accordance with the amount of liquid and flowable material delivered from the reservoir through said discharge means; and
   synchronizing means interconnecting said first and second pumps for synchronizing the outputs thereof to maintain said preselected mixture ratio of liquid and flowable material being delivered into said reservoir.

2. The apparatus as defined in claim 1 wherein first and second pump means are of the air driven positive displacement piston type each including:
   piston means adapted to draw in one of said fluid materials from the source thereof and discharge same into said reservoir;
   an air piston drivably connected to said piston means to cause the latter to draw in and discharge said fluid material at the stroke rate of said air piston, the latter being adapted to stroke by the application thereto of a working fluid such as compressed air from an external source and at a stroke rate which is proportional to the difference in the pressure of the working fluid and the internal pressure of said reservoir, the pressure of the working fluid being selected so that the equilbrium pressure within the reservoir and of said mixture therein is maintained at said predetermined pressure;
   and wherein said synchronizing means includes:
      first means adapted to selectively control the application of the working fluid to each said air driven piston, second means associated with one said air driven piston and responsively connected to said first means to cause the latter to apply working fluid for driving both air driven pistons when the one is traveled to a preselected stroke position, and restrictor means interposed between said first means and the one air driven piston to decrease the flow rate of working fluid to be applied thereto compared to that delivered to the other air driven piston so that the one air driven piston completes its stroke travel to said preselected position after the other air driven piston has completed its corresponding stroke, whereby said pump means are synchronized to discharge the same relative amounts of fluid material through successive stroke cycles thus maintaining said preselected mixture ratio of said mixture.

3. The apparatus in accordance with claim 2 wherein each said air driven piston is arranged to be reciprocally driven to a first position proximate one extreme of stroke travel and to a second position proximate the other extreme of stroke travel, and said second means is additionally responsive to the one air driven piston when the latter is traveled to said first and second stroke positions so as to cause said first means to change the direction of application of the working fluid to both air driven pistons and reverse the direction of drive thereof when the one air driven piston is traveled to said first position and, alternatively, to said second position.

4. The apparatus in accordance with claim 1 wherein at least one of said air driven pistons is provided with adjusting means to vary the length of stroke travel, thereby to vary said mixture ratio to a predetermined value.

5. The apparatus in accordance with claim 4 wherein said adjusting means comprises an adjusting bolt, means threadedly supporting said bolt with the longitudinal axis thereof parallel to the direction of stroke travel of the air piston proximate thereto and with the end of said bolt proximate to last said air piston located so as to predetermine the stroke travel thereof.

6. The apparatus as set forth in claim 1 and
   third pump means having an intake connected in fluid communication with said discharge means of said reservoir to pump said mixture therefrom;

means including at least one discharge nozzle operably connected to the discharge side of said third pump means to vary and direct the amount of the mixture thus discharged through said nozzle, whereby the amount of said mixture drown by said third pump means from said reservoir through said nozzle causes a pressure change within the reservoir to which said first and second pump means respond to restore said preselected pressure of liquid and flowable material in said reservoir and in said preselected mixture ratio.

7. The apparatus as set forth in claim 1 and a storage tank adapted to receive and hold said mixture discharged from said reservoir; and switch means operably connected to said storage tank responsive to a preselected liquid level of said mixture delivered into and held by the storage tank, said switch means being adapted to deactuate said first and second pump means when said preselected liquid level is reached and reactuate last said means to restore the liquid level when the latter is diminished by withdrawal of said mixture from the storage tank.

References Cited

UNITED STATES PATENTS 3,239,100   3/1966   Peterson _____ 222—134 X

M. HENSON WOOD, Jr., Primary Examiner

B. BELKIN, Assistant Examiner

U.S. Cl. X.R.

103—49; 134—100; 137—9; 222—134; 239—127, 304